(12) United States Patent
Gumpenberger

(10) Patent No.: US 6,554,499 B1
(45) Date of Patent: Apr. 29, 2003

(54) APPARATUS FOR SUPPLYING CONSISTENT, PROPERLY EXPOSED AND HIGH RESOLUTION VIDEO IMAGES FOR THE PURPOSE OF PHYSICAL IDENTIFICATION AND PROCESS FOR MAKING SAME

(76) Inventor: Marcus Egon Gumpenberger, 141 Bessborough Dr., Keswick Ontario (CA), L4P 2R7

( * ) Notice: Subject to any disclaimer, the term of this patent is extended or adjusted under 35 U.S.C. 154(b) by 0 days.

(21) Appl. No.: 09/617,846

(22) Filed: Jul. 17, 2000

(51) Int. Cl.[7] .................. G03B 17/00; G03B 29/00; H04N 7/18; H04N 9/47
(52) U.S. Cl. .................. 396/427; 396/433; 348/143
(58) Field of Search .................. 396/419, 427, 396/433; 348/135, 143, 150, 151; 33/758, 759; 340/541, 545.1, 545.2, 545.3, 545.4

(56) References Cited

U.S. PATENT DOCUMENTS

| | | | |
|---|---|---|---|
| 5,541,585 A | * 7/1996 | Duhame et al. | 340/5.62 |
| 5,615,622 A | 4/1997 | Moses et al. | 109/2 |
| 5,907,352 A | * 5/1999 | Gilley | 348/151 |

FOREIGN PATENT DOCUMENTS

| | | | |
|---|---|---|---|
| CA | 2231122 | 1/1997 | H04N/7/18 |
| CA | 2210572 | 1/1998 | H04N/7/18 |
| CA | 2248473 | 12/1998 | H04N/7/18 |

\* cited by examiner

*Primary Examiner*—David M. Gray
*Assistant Examiner*—Rochelle Blackman
(74) *Attorney, Agent, or Firm*—Dimock Stratton Clarizio; Mark B. Eisen

(57) ABSTRACT

An apparatus and process for installation for supplying superior closeup images of an individuals face and provide a height measurement device for witnesses for the purpose of identification with the steps of; utilizing sunlight to illuminate a subject's face for better exposure, always being directed towards the path of an individual arriving or exiting a building or structure, placed at eye level to avoid physical obstructions and a multiple axis mounting system to enable fine position adjustments. Preferred embodiments include a machine that is installed on a door frame or wall, facing into a building structure no less than ninety degrees from an existing outdoor light source, facing towards the suspects path of exit, a machine that is covert in it's operation and provides a height scale for witnesses to identify a subjects height as they leave through the door.

12 Claims, 5 Drawing Sheets

APPARATUS FOR SUPPLYING CONSISTENT, PROPERLY EXPOSED AND HIGH RESOLUTION VIDEO IMAGES FOR THE PURPOSE OF PHYSICAL IDENTIFICATION AND PROCESS FOR MAKING SAME

BACKGROUND OF THE INVENTION

This invention generally relates to the field of C.C.T.V. (Closed Circuit Television) in a video surveillance application, more directly to a type of camera used to supply video images to a common multi or single camera recording device. These systems usually consist of a series of cameras placed strategically within a residential or commercial building in hopes of documenting a crime in progress and providing investigators with clues and leads to the people involved in the crime and ultimately bring them to justice.

The most difficult task for a C.C.T.V. installer is to be able to predict the path a potential thief will take while committing his/her crime and position cameras in those areas best suited for documenting the incident and provide a description of the suspect. When positioning those cameras the following things are taken into account; "Suspect actions", to identify the incident. "Suspect clothing", to identify what he/she was wearing. "Suspect facial features", to identify the person. The latter being important.

At present, C.C.T.V. cameras used for facial identification are being placed at entrances inside buildings facing, towards the door as clients enter the building. This has lead to consistently poor quality images due to the fact cameras, have to be placed on ceilings to avoid obstructing traffic and tampering and into the sunlight to capture people as they walk into the building. The height has resulted in the hats obstructing peoples faces and the intense sunlight has provided silhouette images of the subjects due to cameras automatically trying to adjust its iris to compensate for the intense "backlight".

Things have been attempted by manufacturers and installers to correct these problems, but nothing has been successful. "Backlight" compensation was developed for cameras, but it only works well in minor sunlight situations. Cameras have been positioned at doorways pointing down and across the door, keeping out of the sun, but distorting and obstructing the field of view further. Cameras have been installed in door frames, but was found to be labor intensive, not versatile and decreased the structural integrity of the door. Wide angle lenses have also been used to capture a larger area, which only makes the subject smaller, and more difficult to identify.

SUMMARY OF THE INVENTION

The primary object of the invention is to provide an apparatus that can overcome the problems experienced by conventional security cameras and their limitations to produce a superior image for the purpose of physical identification.

Another object of the invention is to provide a surveillance camera and method that utilizes all the elements needed for creating a precise image.

Another object of the invention is to provide a covert image gathering device.

Another object of the invention is to provide a secure, tamper resistant housing.

Another object of the invention is to provide a measuring scale for height identification.

Other objects and advantages of the present invention will become apparent from the following descriptions, taken in connection with the accopanying drawings, wherein, by way of illustration and example, an embodiment of the present, invention is disclosed.

An apparatus for supplying visual images for the purpose of identification comprising: an imaging device that uses the element of outdoor light to illuminate it's subject's, capturing an individual's arrival and departure of a building or structure, located directly in front of the subject to avoid physical obstructions and enable to the individual to approach the device without detecting it's purpose to allow a high resolution/closeup image to be transmitted to a device.

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

Detailed descriptions of the preferred embodiments are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

The invention utilizes a modified miniature camera 30 that is placed inside a specialized housing 20. This housing 20 has been designed by an expert in the field of video forensic technology where trying to identify suspects through conventional C.C.T.V. systems and technics is too difficult and sometimes impossible. Cameras have always required the three basic elements of light for illumination, angle of view for unobstructed lines of site and closeup images for the best possible resolution. It has been observed that cameras have tried to achieve good images by going against these elements, and have failed. Through these frustrations and consistently unreliable images the idea of supplying an undetectable camera located in an unavoidable area with a key light source to help illuminate the subject would be a much needed improvement on past technologies in the surveillance industry and an asset to law enforcement and other agencies.

Figure 1:
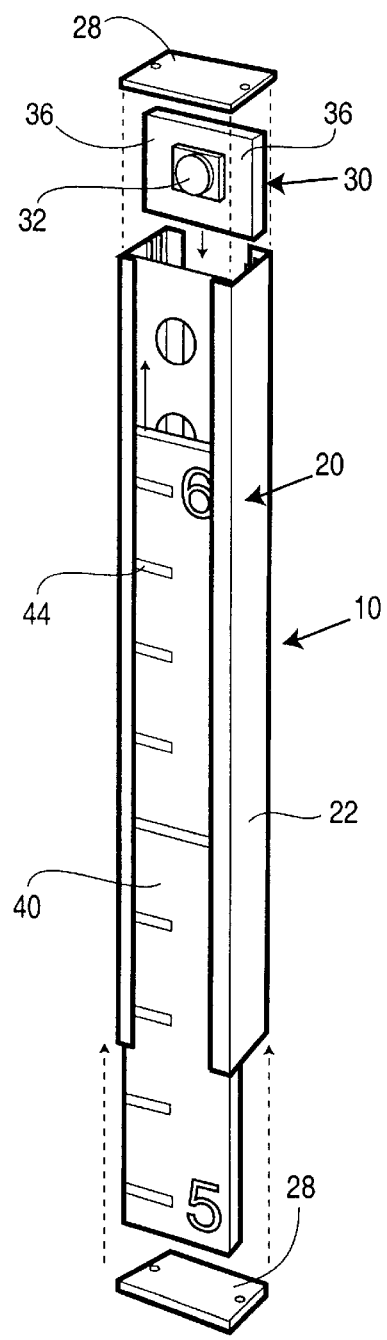
FIG. 1 is a perspective view of the elements contained in the invention.

Turning to the drawings, you will notice in (FIG. 1) the components that are included in the invention. The end caps 28 which are pictured at the top and bottom of the housing 20 are used to seal each end and hold the filter 40 from sliding. The miniature camera 20 is pictured below the top end cap 28, it slides into the guide tracks 38 provided by the housing 20, the wires provide power and supply the feed for a video signal to be sent to the recording device. Under the camera 30 and at the bottom of the housing 20 is a 1½" diameter washer which is used to fasten the back of the housing 20 to a door frame or wall 4. The housing 20 itself is made of extruded 1/16" gauge extruded aluminum. Sliding into the front of the housing 20 with a marked height measuring scale 44 is the lens filter 40.

Figure 2:
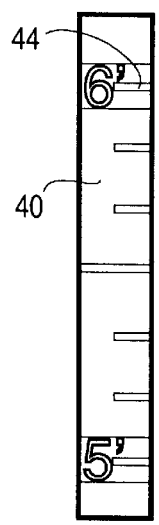
FIG. 2 is a plan view of the lens filter.

(FIG. 2) is front view of the filter 40, this has four functions: One, it conceals the camera lens 32 from the public eye while allowing the camera 30 to shoot through. Two, it protects the lens 32 from dust and scratches. Three, it acts as a measuring device that enables eye witnesses to identify a subject's height. Four, determines the proper installation height for the housing 20 set between five and 6 feet.

Figures 3A, 3B:
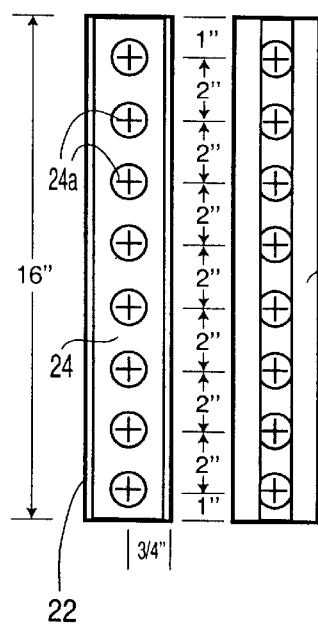
FIG. 3a is a front plan view of the camera housing and lens holes.
FIG. 3b is a back plan view of the camera housing and lens holes.

(FIGS. 3a and 3b) display a front and back view of the housing 201. The front is shown to be 16" high and 1½" wide with ½" diameter holes spaced 2" apart on center, allowing for a variety of vertical positions. The back exhibits a ¾" opening to enable easy access for camera adjustment and wiring hookup and acts as a base for the mounting hardware.

Figure 4:
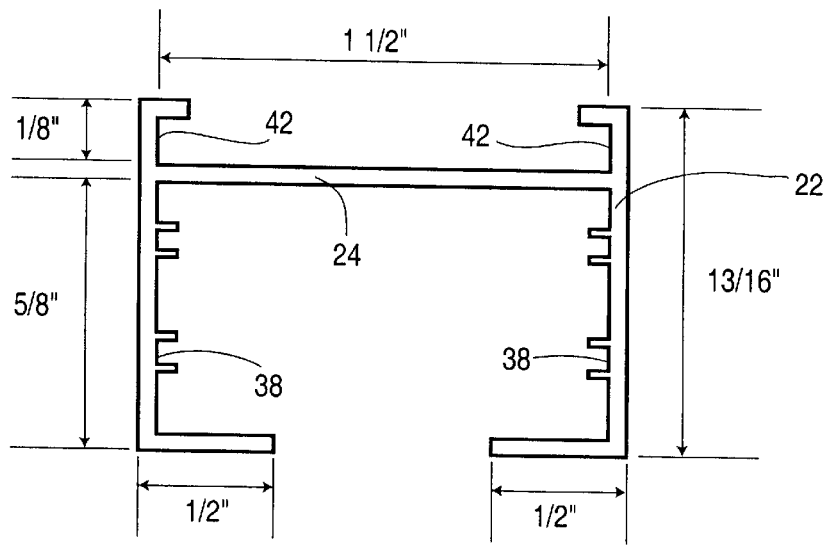
FIG. 4 is a cut section of the camera housing.

(FIG. 4) shows the dimensions of the extruded casing 22. Included in this view are the guide tracks 38 for the camera 30 and the screw holes for fastening the end cap 28.

Figure 5:
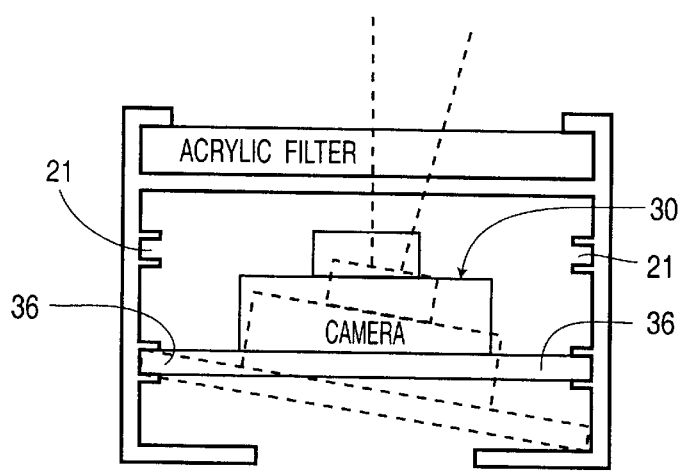
FIG. 5 is a cut section of the camera housing, portraying the filter and camera positions.

(FIG. 5) Illustrates the position of the filter 40 and the camera 30 within the casing 22. The horizontal position of the camera 30 can be adjusted ten degrees to either side by taking one end of the camera 30 out of the guide track 38 and placing it behind the guide track 38 against the back base 26 shown in phantom.

Figure 6:
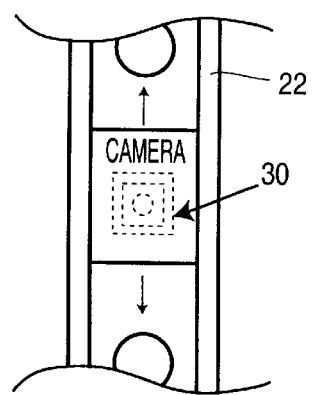
FIG. 6 is a plan view showing the vertical movement of the camera in the housing.

(FIG. 6) Portrays the vertical positioning of the camera 30.

Figure 7:
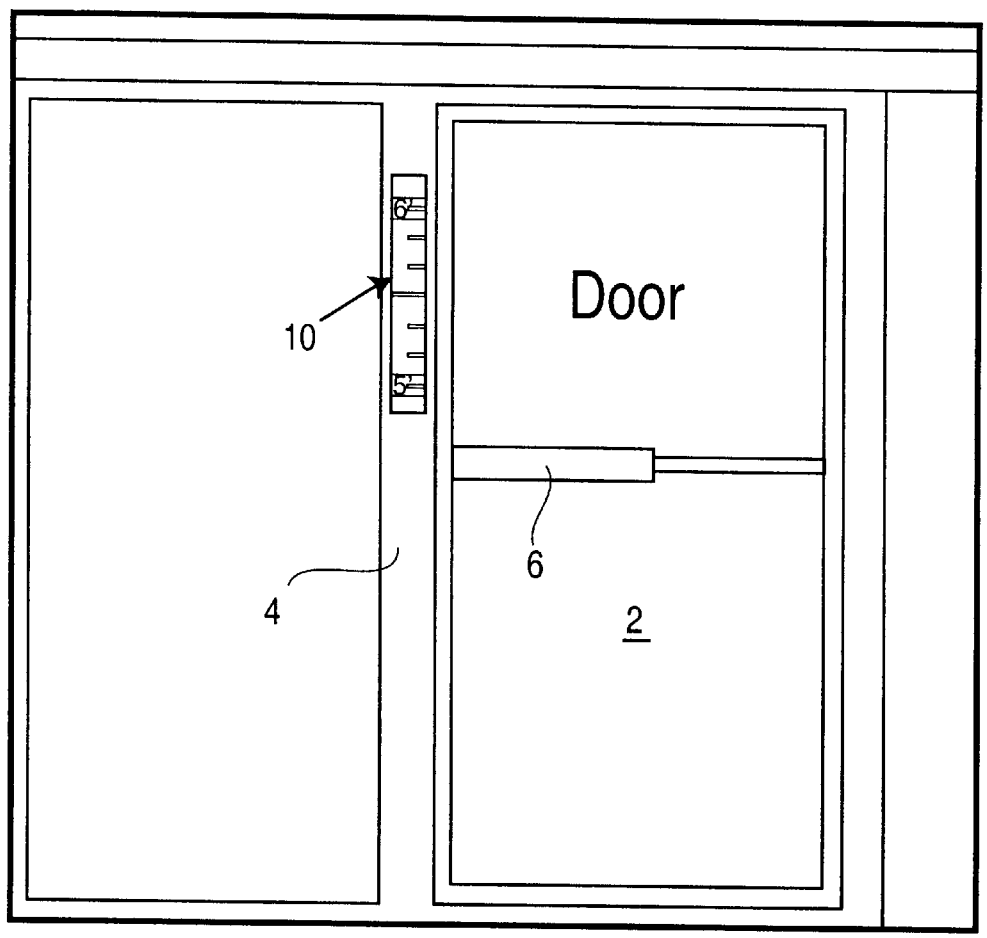
FIG. 7 is a plan view of a typical doorway installation.

(FIG. 7) is a typical single doorway installation. The invention is to be placed on the same side of the doorhandle 6 to allow for a closer field of view of the subject. It is to be placed at the proper height designated by the scale 44 on the filter 40. Pointing inwards with the exterior light behind it.

Figure 8:
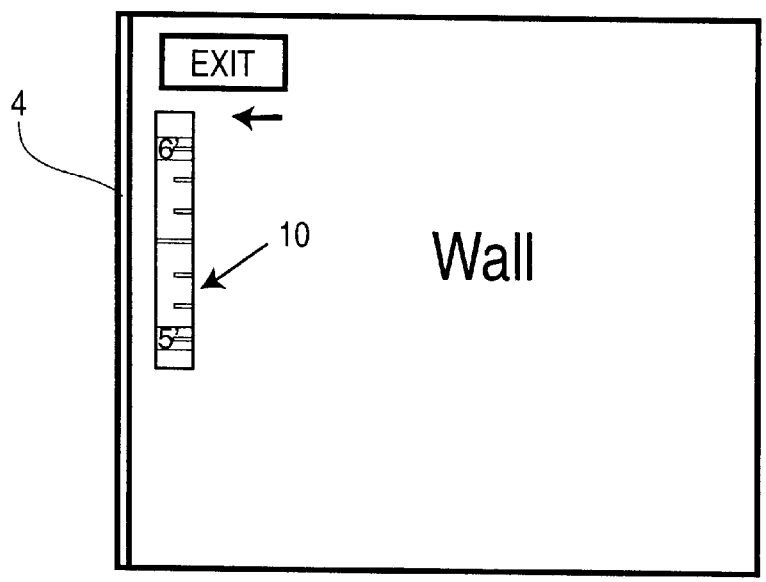
FIG. 8 is a schematic diagram of the process for installing the invention on a wall.
Figure 8A:
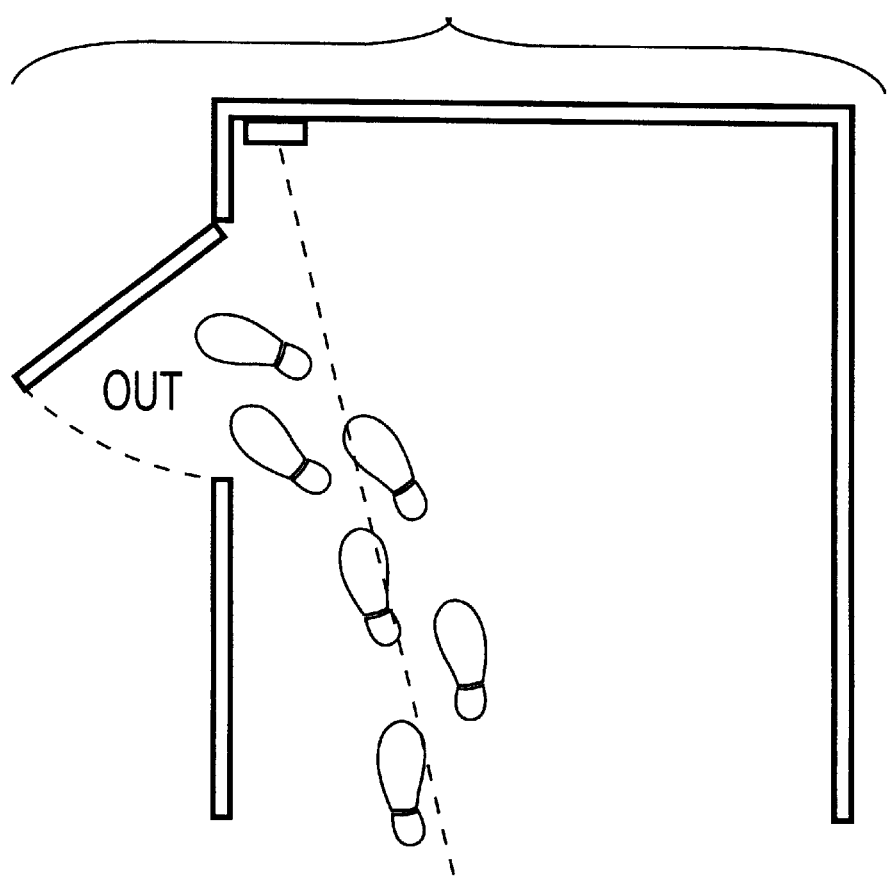

(FIG. 8) explains the process for installing the invention on a wall 4 in the direct path of an individual. The housing 20 is always facing into a building or structure directly into the line of traffic entering or exiting the facility. This enables a clear unobstructed view of the suspect. It also increases the chances of a subject looking up into the camera 30 as they reach for the door handle or bar 6. This type of positioning also enhances the subject's facial features utilizing daylight for illumination. Also, by placing the camera 30 in the direct path of the subject i should be known, blurring effects caused by lateral movement are reduced due to the fact the subject is moving directly into the picture frame and not from one side to the other.

Figure 9:
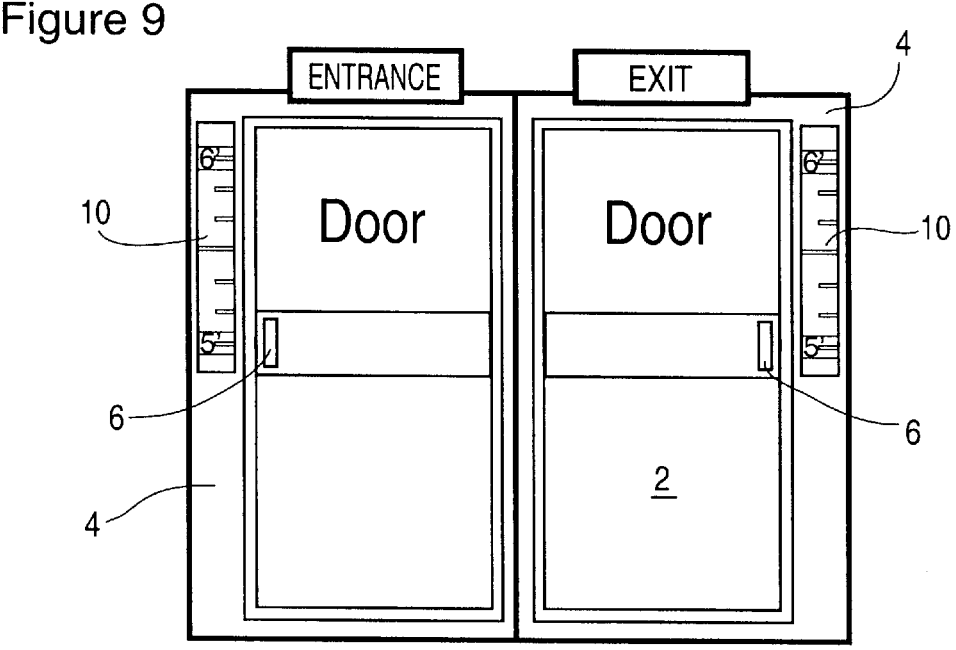
FIG. 9 is a schematic diagram of the process for installing the invention on a two doorway system.
Figure 9A:
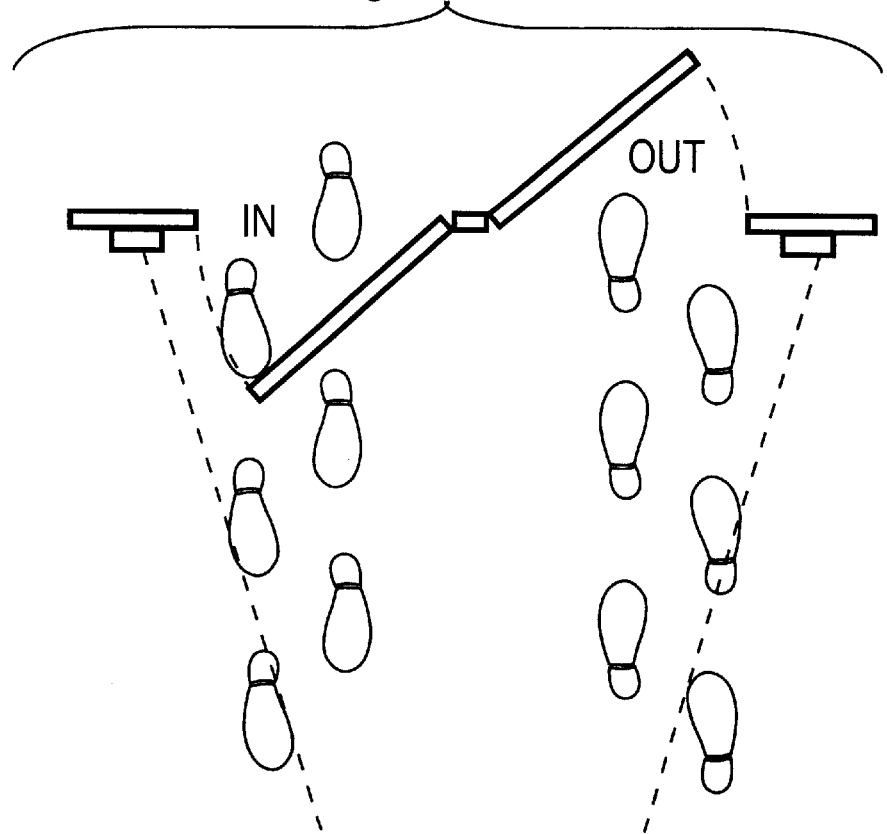

(FIG. 9) shows the process of placing the invention 10 on a double door 2. There is one placed at the entrance facing inwards to obtain a rear description of the subject's clothes and hair or capture a frontal image of a subject leaving out through the in door. The other is situated at the exit door facing inwards for a frontal shot of the subject. The angle of the camera 30 is also portrayed by the site line depiction, notice the ten degree adjustment directed towards the footpath.

While the invention has been described in connection with a preferred embodiment, it is not intended to limit the scope of the invention to the particular form set forth, but on the contrary, it is intended to cover such alternatives, modifications and equivalents as may be included within the spirit and scope of the invention as defined by the appended claims.

What is claimed is:

1. An apparatus for supplying images for the purpose of identification, comprising:
    an imaging device directed towards a path of departure from a building or structure, contained within a housing and mounted generally at eye level, the housing providing a scale to allow height identification of a person by witnesses,
    the imaging device being concealed within the housing, to enable the imaging device to go undetected while allowing light to be received by the imaging device,
    whereby the imaging device supplies a frontal image of the person leaving the building or structure.

2. The apparatus of claim 1 in which the apparatus is mounted on a door mullion.

3. The apparatus of claim 1 comprising a multiple axis mounting system to enable fine adjustments to position the imaging device.

4. The apparatus of claim 1 in which a lens of the imaging device is concealed by a filter.

5. The apparatus of claim 1 in which the device is mounted at an angle of at least 90 degrees from an outdoor light source.

6. The apparatus of claim 1 in which the imaging device is mounted at a height substantially between four feet and six feet.

7. A method of supplying images for the purpose of identification, utilizing an imaging device concealed within a housing which provides a scale to allow height identification of the person by witnesses, to enable the imaging device to go undetected while allowing light to be received by the imaging device, the method comprising the steps of:
    mounting the imaging device directed towards a path of departure from a building or structure, generally at eye level, and
    obtaining a frontal image of a person leaving the building or structure.

8. The method of claim 7 including the step of mounting the imaging device on a door mullion.

9. The method of claim 7 including the step of adjusting a position of the imaging device using a multiple axis mounting system.

10. The method of claim 7 including the step of concealing a lens of the imaging device behind a filter.

11. The method of claim 7 including the step of mounting the device at an angle of at least 90 degrees from an outdoor light source.

12. The method of claim 7 including the step of mounting the imaging device at a height substantially between four feet and six feet.

\* \* \* \* \*